United States Patent [19]

Bregnard et al.

[11] Patent Number: 4,793,208
[45] Date of Patent: Dec. 27, 1988

[54] CRANK-GEAR FOR BICYCLE OR SIMILAR LOCOMOTION VEHICLE

[75] Inventors: Jean-Pierre Bregnard, La Chaux-de-Fonds, Switzerland; Michel Bezin, Nevers; Yves Boisot, Varennes Vauzelles, both of France

[73] Assignee: Société Look, Névers Cédex, France

[21] Appl. No.: 934,632

[22] PCT Filed: Mar. 12, 1986

[86] PCT No.: PCT/FR86/00080

§ 371 Date: Jan. 7, 1987

§ 102(e) Date: Jan. 7, 1987

[87] PCT Pub. No.: WO86/05459

PCT Pub. Date: Sep. 25, 1986

[30] Foreign Application Priority Data

Mar. 13, 1985 [CH] Switzerland ............... 01121/85

[51] Int. Cl.⁴ ............................................ G05G 1/14
[52] U.S. Cl. ............................ 74/594.2; 74/594.3; 280/2.36; 474/71
[58] Field of Search ............... 74/594.1–594.3, 74/116–119, 68; 280/236, 238, 259, 260; 474/71, 69, 72

[56] References Cited

U.S. PATENT DOCUMENTS

| 622,085 | 3/1899 | Shepard | 74/594.2 |
|---|---|---|---|
| 3,906,807 | 9/1986 | Trammell, Jr. | |
| 4,029,334 | 6/1977 | Trammell, Jr. | |
| 4,159,652 | 7/1979 | Trammell, Jr. | |
| 4,281,845 | 8/1981 | Brown | 74/594.2 |
| 4,309,043 | 1/1982 | Brown | 74/594.2 |

FOREIGN PATENT DOCUMENTS

| 0071498 | 2/1983 | European Pat. Off. | 74/594.3 |
|---|---|---|---|
| 3425342 | 1/1986 | Fed. Rep. of Germany | 74/594.2 |
| 763303 | 4/1934 | France | |
| 905476 | 12/1945 | France | |
| 978674 | 4/1951 | France | |
| 984583 | 7/1951 | France | |
| 2520692 | 8/1983 | France | |
| 2526392 | 11/1983 | France | |
| 462260 | 3/1951 | Italy | 74/594.2 |
| 80/01579 | 6/1981 | PCT Int'l Appl. | 74/594.1 |
| 2050971 | 1/1981 | United Kingdom | 74/594.1 |

Primary Examiner—Richard E. Moore
Assistant Examiner—Vinh Luong
Attorney, Agent, or Firm—Pollock, Vande Sande & Priddy

[57] ABSTRACT

This crank-gear includes cranks centered on a first axis and respectively mounted on shafts journalled into one another in the bicycle crank-gear case. Each shaft bears a guide cooperating with sliders which are fixed to rotate with the sprocket plates actuating the chain with an orbital movement around a second axis. In view of the offset between the first and second axes and the relative arrangement of the cranks and guides the cranks are aligned with one another only when horizontal. Furthermore, when one of the cranks is at bottom dead center the other crank is forwardly offset by a certain distance relative to top dead center. An improved pedalling efficiency is thereby obtained.

12 Claims, 7 Drawing Sheets

U.S. Patent Dec. 27, 1988 Sheet 1 of 7 4,793,208
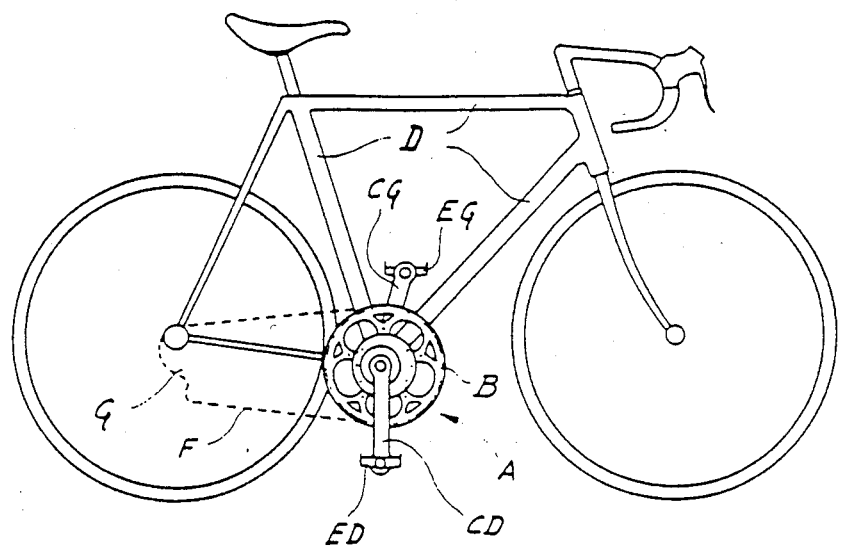
Fig.1
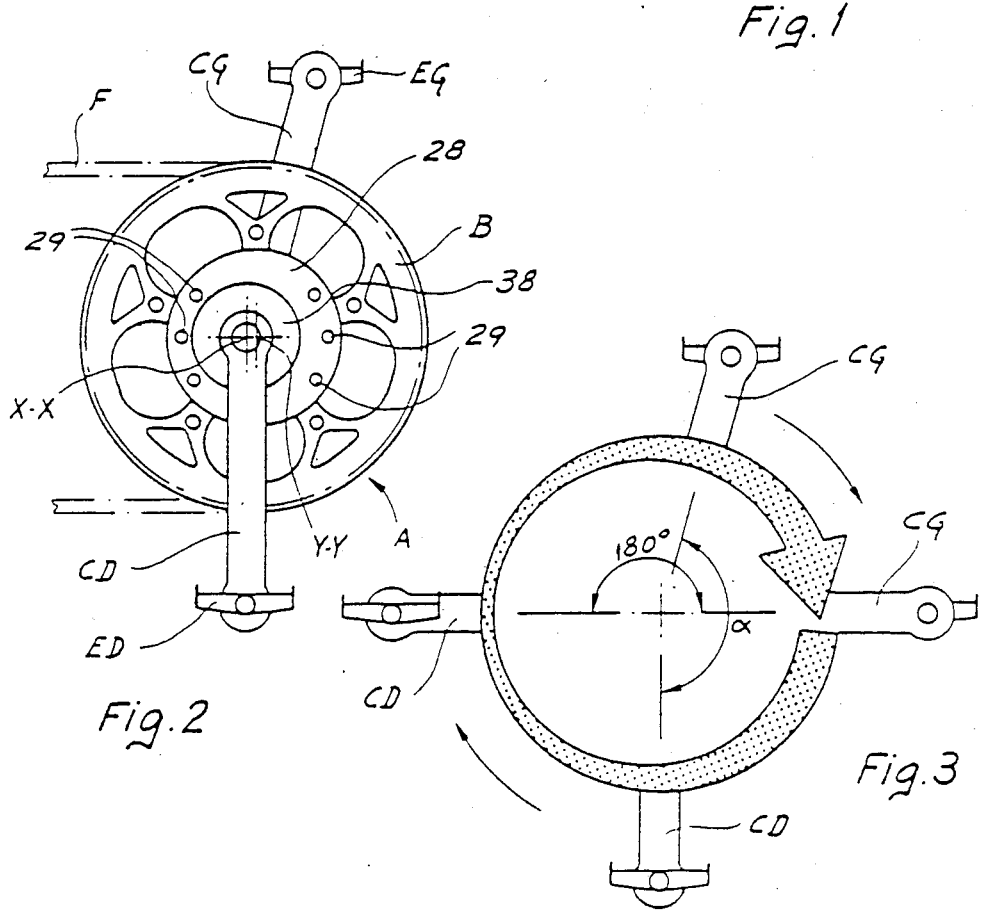
Fig.2
Fig.3

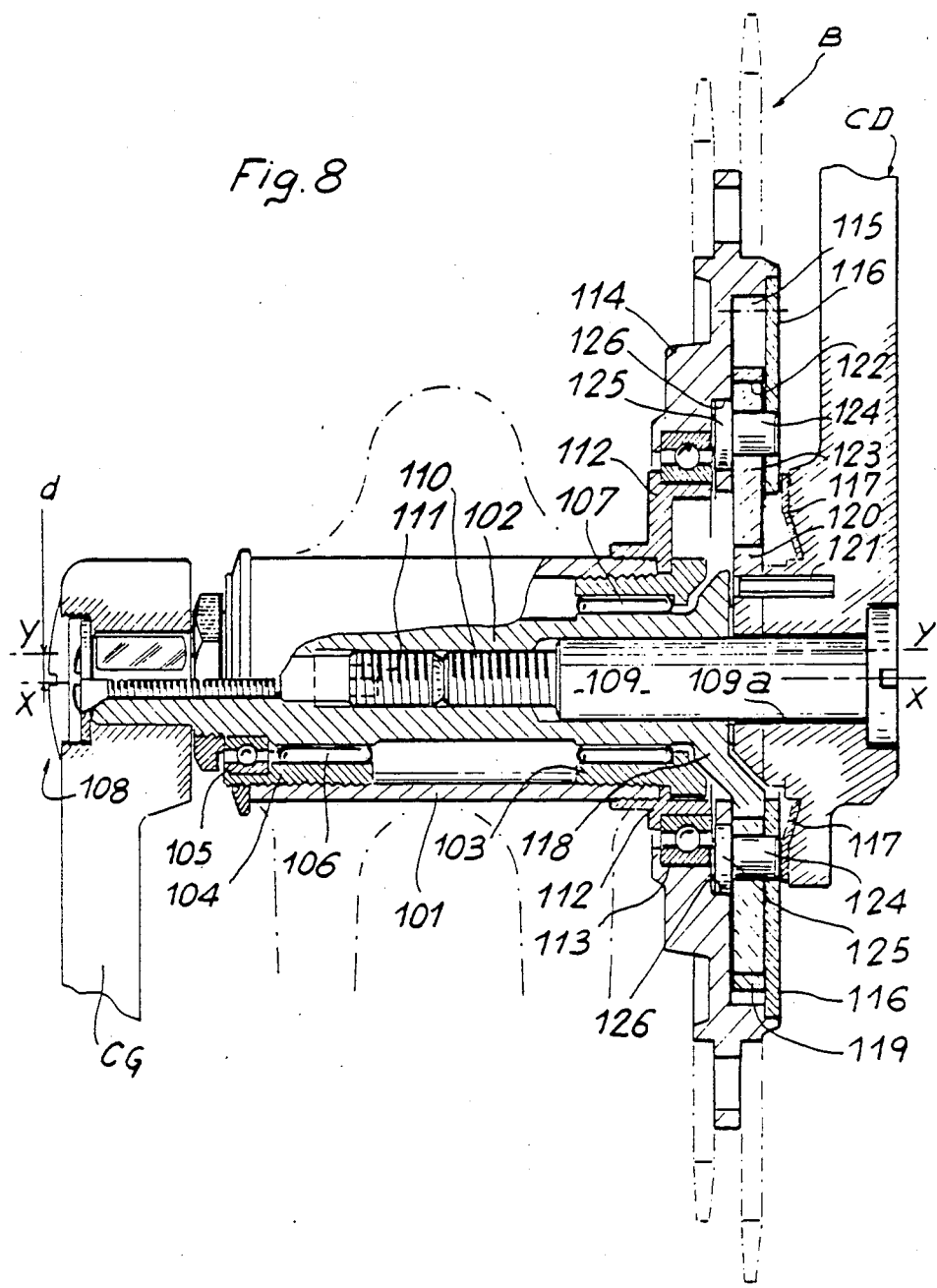

CRANK-GEAR FOR BICYCLE OR SIMILAR LOCOMOTION VEHICLE

RELATED APPLICATIONS

This application is the national phase application of International Application Serial No. PCT/FR86/00080 filed on Mar. 12, 1986.

TECHNICAL FIELD

This invention concerns a crank-gear for a bicycle or similar lomotion vehicle wherein the driving of the wheel is effected by means of a chain actuated by a sprocket driven by the crank-gear.

BACKGROUND OF THE INVENTION

The crank-gear of a bicycle usually includes two cranks each associated with a pedal and mounted at the respective extremities of a shaft which traverses axially a crank-gear case provided in the lower part of the frame. This shaft likewise bears the toothed sprocket plate or plates intended to drive the chain. The assembly rotates around the axis defined by the crank-gear case. The cranks being diametrally aligned in a rigid manner, it is found that at their top and bottom dead center points, i.e. when they are vertical, the effort provided by the cyclist is not transformed into a driving force for the chain while at some angular distance on either side of these dead center points such effort is inefficiently transmitted.

In an effort to overcome these difficulties, it has already been proposed (for example by the French utility certificate 2.526.392) to disconnect these cranks from the sprocket plate and to have them turn about an axis different from that about which the sprocket plate rotates. Transmission means are then provided to connect the cranks to the sprocket plate in a manner such that the offset between the two rotating systems is at no time bothersome. There results however that the angular position of the two cranks relative to one another is in constant variation during rotation of the crank-gear.

From the disclosure in the French utility certificate previously mentioned, it may be determined that the transmission means are formed from two guides, one per crank, radially oriented and fixed to these cranks. Each guide cooperates with a roller which is fixedly mounted in the sprocket plate in a manner to describe with the latter an orbital movement around the center of the sprocket plate.

One of these guides is directly placed on a crank (that on the right for instance), while the other is placed on a lever fixed to the axis of the crank-gear and united with the other crank (arranged at the left on this axis).

Furthermore, the abovementioned utility certificate provides a mechanism regulating the offset between the axes of the cranks, on the one hand, and of the sprocket plate on the other hand, in order to be able to adjust the relative inclination of the cranks to one another.

If this prior art mechanism thereby permits effectively to avoid vertical aligmnent of the cranks and thus their simultaneous passage through the dead center top and bottom points, it is to be noted that such result is obtained by means of a construction of an impractical nature which renders it almost unemployable.

Initially in effect the transversal space requirement of this crank-gear is considerable and the cranks are for this reason spread apart from one another by a substantial and impractical distance. This is not only unfavourable from an aerodymamic viewpoint, but also and above all creates considerable discomfort for the cyclist who must thus pedal with much too great a spread between his feet.

This substantial transversal space requirement along the axis of the cranks is due to the fact that the shaft of the crank-gear must project from the right of the case over a considerable distance in order to be able to form a rotation bearing for the right-hand crank as well as means for fastening the lever which assures transmission of the force to the sprocket plate from the lefthand crank. In other words, the shaft of the crank-gear exhibits a substantial overhang out of the crankgear case while precisely, the entire effort of the cranks is applied to this overhanging shaft end. As the stress to which the shaft is thus subjected varies constantly, said shaft is subjected to variable and repetitive strains which give rise to a very substantial risk of breakage.

Furthermore, since at least one of the cranks includes a guide, it cannot be of a type normally available in commerce. This increases not only the cost of the crank-gear, but likewise the cost of repairs should such crank have to be replaced for one reason or another.

In addition, the mechanism described in this prior art document is completely exposed during its function to dirt and to the impact of gravel, including the slides and the rollers which cooperate together for transmission of the movement, in a manner such that the mechanism becomes rapidly unusable if not regularly and carefully cleaned.

The purpose of the invention is to provide a crank-gear of the general type mentioned hereinabove, but arranged to avoid the cited difficulties, such crank-gear being of a compact construction practically fluid tight and thus not subject to breakdowns due to dirt and of a solidity comparable to that of standard crank-gears which include a rigid coupling between the cranks and the sprocket plate.

It should also be noted that a crank-gear exhibiting an offset between the rotation axes of the sprocket plate and the crank has been described in the French utility certificate No. 2,520.692. The construction of this mechanism is vey similar to that of the arrangement described in the French utility certificate 2.526.392 already mentioned and thus includes the same difficulties. Furthermore, in this second utility certificate the relative arrangement of the sprocket plate and the cranks is such that the latter are aligned in their vertical position. This known construction thus maintains the disadvantages of the rigid crank-gears as far as the simultaneous passage of the cranks through the top and bottom dead center points is concerned.

SUMMARY OF THE INVENTION

The object of the invention is thus a crank-gear for a bicycle comprising two cranks bearing pedals and which are rotatively mounted about a first axis in the crankgear case fixed to the bicycle frame, at least one sprocket plate having teeth to actuate the chain, rotatively mounted in said gear case about a second axis parallel to the first axis, but offset relative to the latter by means of a decentering ring fixed on the crank-gear case and exhibiting an external cylindrical surface centered on the second axis, transmission means comprising a guide for each crank radially disposed relative to the first axis, a roller arranged to be displaced relative to each guide whilst being supported thereon in a circumferential direction so as to transmit the pedalling force, said rollers corresponding to the cranks being fixed to said sprocket plate so as to describe in the course of crank rotation an oscillating orbital movement, said cranks being mounted to rotate in said crank-gear case relative to one another about said first axis and said guides being respectively fixed to each of said cranks and arranged in a common plane at the side of the sprocket plate.

There initially results from these characteristics that the cranks require no particular machining in a manner such that they may in case of necessity be of the standard type presently available in commerce.

Furthermore, assuming that each of these cranks has its own shaft bearing at the same time the guide associated therewith, there is obtained a compact construction, above all in the axial sense, which reduces to a minimum the overhang of the shafts out of their bearings mounted in the crank-gear case.

Finally, it becomes possible to enclose the assembly of the mechanism in a sealed housing thereby protecting it against damaging exterior elements.

In one particular embodiment of the invention, the cranks are respectively fixed to two coaxial shafts mounted to rotate relative to one another, the guides being fixed on said shafts at one of their common ends.

In another embodiment, one of the cranks is fixed to a shaft journalled through the crank-gear case and terminating at its end on the side of the sprocket plate by the corresponding guide, the other crank being coaxially mounted about said shaft and being fixed to its own guide extending parallel to said crank.

BRIEF DESCRIPTION OF THE DRAWINGS

FIG. 1 shows schematically a bicycle provided with a crank-gear according to the invention;

FIG. 2 is an elevation view of the crank-gear seen from the right side;

FIG. 3 is a diagram schematically showing the change of speed of rotation of the cranks of the crankgear, the sprocket plate of the latter being supposed to turn at constant speed; the diagram likewise shows the alignment of the cranks in a horizontal position and their angular offset in the vertical position;

FIG. 8 is a cross-section, taken along a plane passing through the axis of the crank-gear case, of a second embodiment of the invention;

DESCRIPTION OF THE PREFERRED EMBODIMENTS

On FIG. 1 has been shown a bicycle which includes a crank-gear A with one or several sprocket plates B, as well as a set of cranks, namely the right crank CD and the left crank CG. The crank-gear A is designed in accordance with the features of the invention. The bicycle otherwise of standard form includes a frame D to which is rigidly fastened a crank-gear case 1 (see in particular FIG. 4) which is not visible on FIG. 1. The crankgear, provided with pedals ED and EG, may drive the rear wheel of the bicycle via chain F and a derailleur mechanism G.

By examining FIGS. 2 and 3 it will be seen that the crank-gear A possesses two horizontal rotation axes X—X and Y—Y offset relative to one another, the first being that around which turn cranks CD and CG, the second that which defines the rotation center of the sprocket plate or plates B. In the embodiment described herein, the axes X—X and Y—Y are located in the same horizontal plane, the axis Y—Y being placed in front of the axis XX when the bicycle is viewed in use.

FIG. 3 shows that cranks CD and CG are aligned relative to one another only when they occupy the horizontal position and that the angle which they form between themselves constantly changes during this rotation. More precisely, the angle formed by the cranks which is 180° at the horizontal, decreases to a minimum value $\alpha$, reached when the lower crank is vertical, then increases to 180° when the two cranks following a quarter of a turn, are once again horizontal. Typically, angle $\alpha$ is on the order of 165°. It will likewise be observed, supposing that sprocket plate B turns at constant speed, that the descending crank (on FIG. 3 crank CG) advances at diminishing speed in the first quadrant towards a minimum, then progressively increases in the second quadrant, while the rising crank has its speed increased in the third quadrant towards a maximum, then again diminishes in the fourth quadrant, the arrow of variable thickness shown on the schematic drawing illustrating the deceleration of the crank. As is well understood, this process is the same when the righthand crank is descending and the lefthand crank rising. In all cases, the cranks are never vertically aligned.

Figure 4:
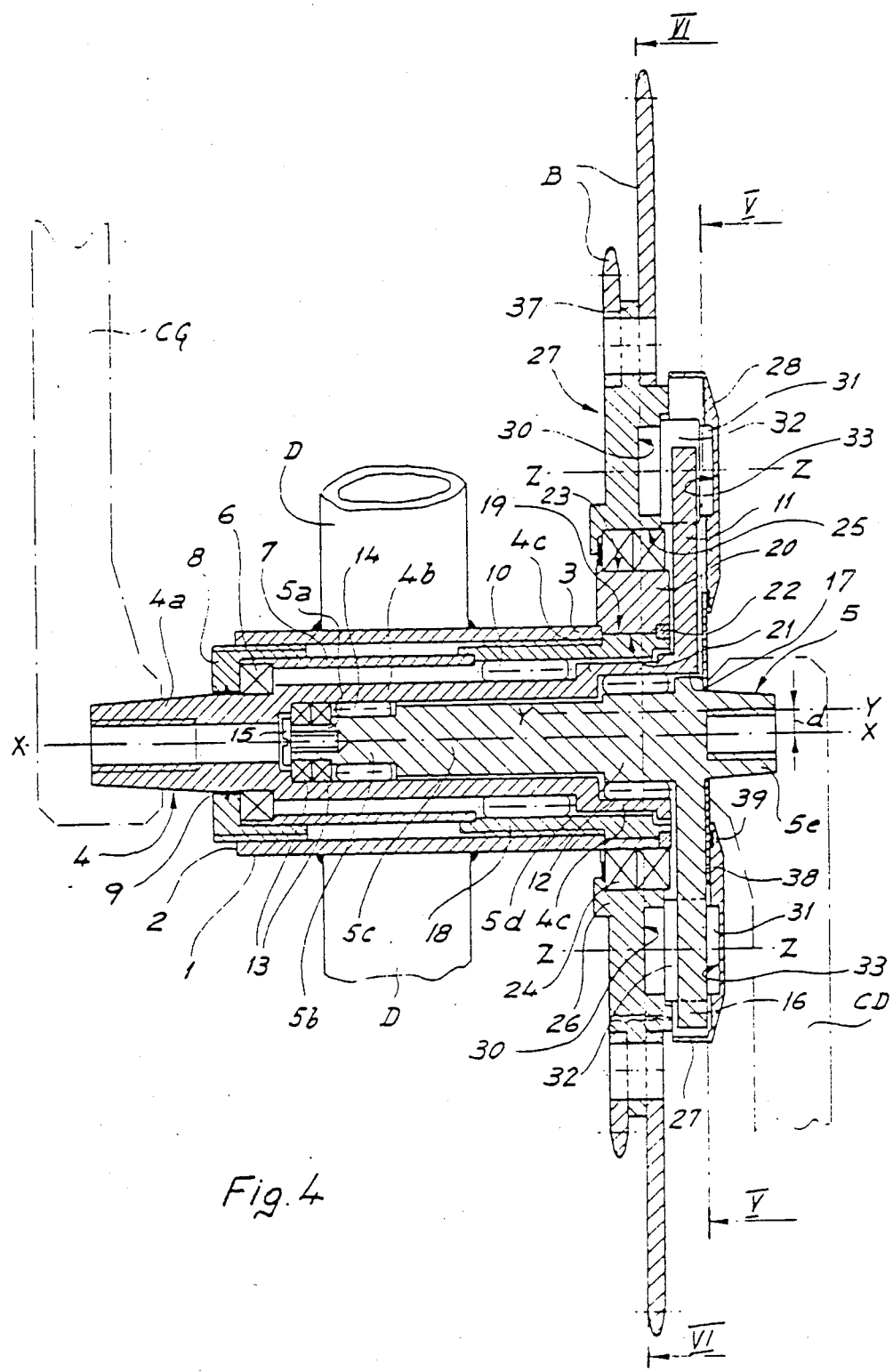
FIG. 4 is a horizontal cross-section through a plane containing the rotation axes of the cranks and the sprocket plates of a first embodiment of a crank-gear according to the invention, the front of the bicycle being supposedly situated at the top of the Figure.
Figure 5:
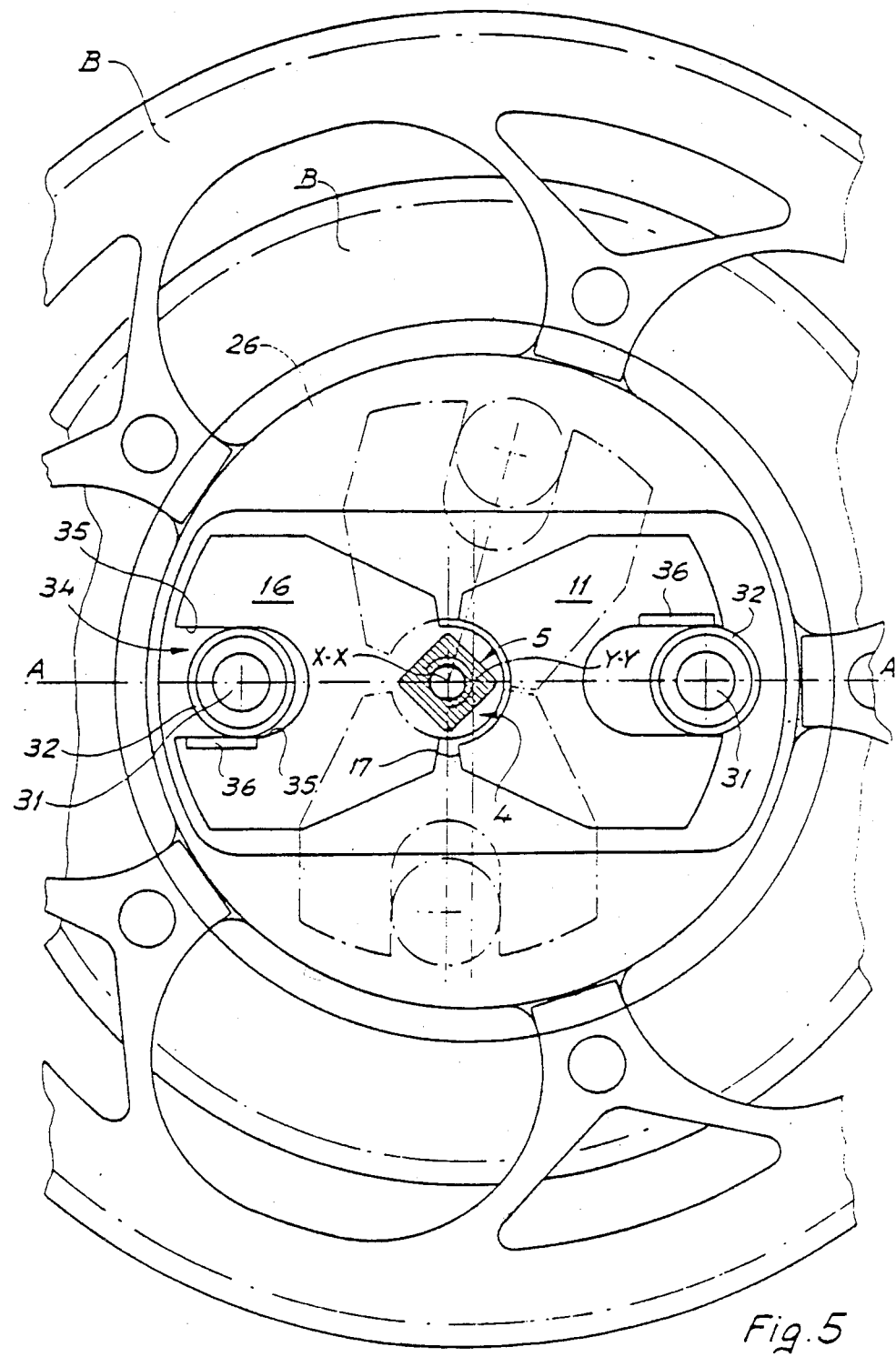
FIG. 5 is a face view of the crank-gear according to FIG. 4 considered from the righthand side of the bicycle, the outer half of the protection housing being omitted to show the construction of the guides as well as their cooperation with the rollers of the sprocket plate carrier.
Figure 6:
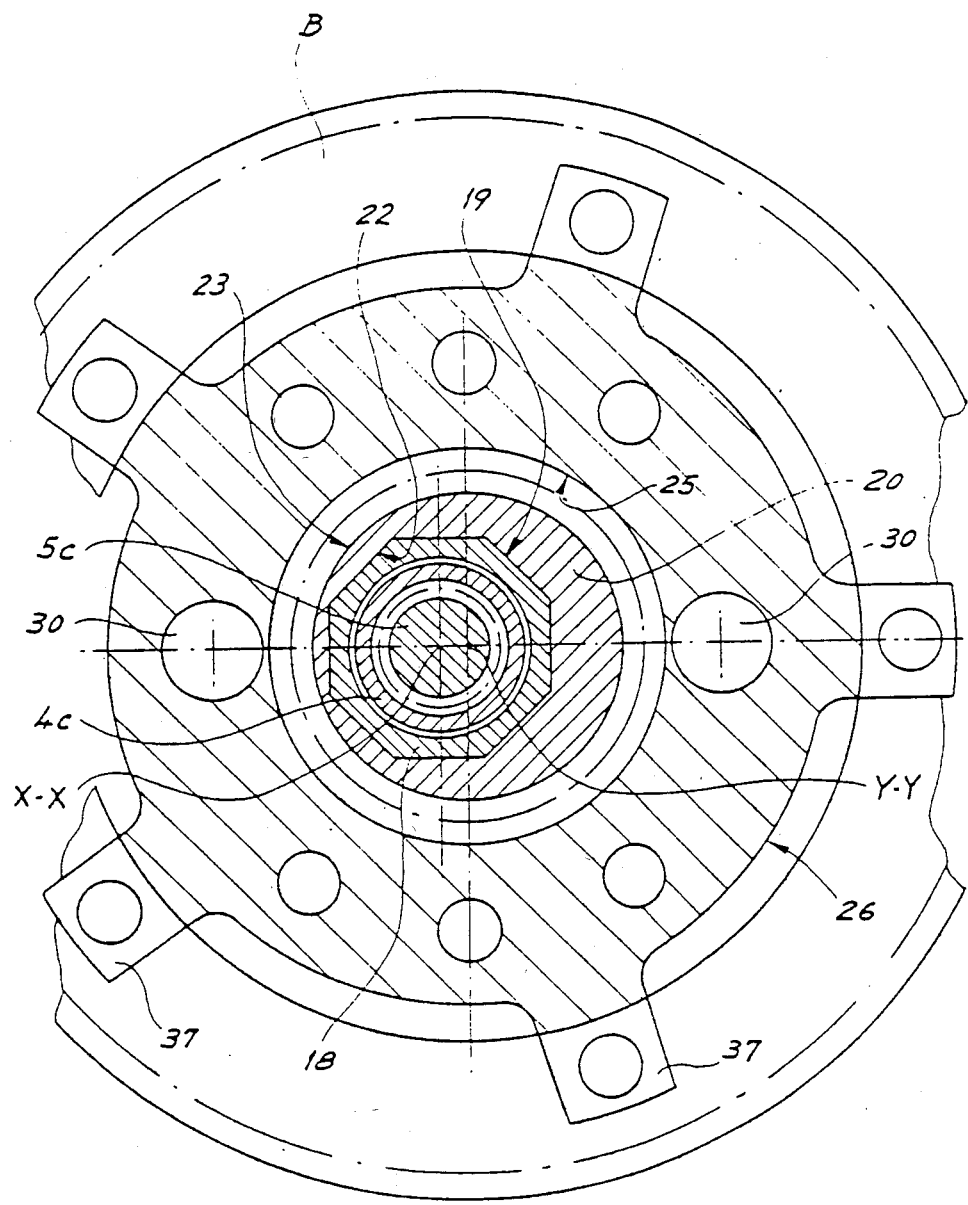
FIG. 6 is a vertical cross-section of the crank-gear taken through the decentering ring and an octagonal nut which is matched thereto.

There will now be described a first embodiment of the invention in referring to FIGS. 4 to 6. The crank-gear case 1 is formed by a section of cylindrical tubing, the axis of which coincides with the axis X—X of the cranks CG and CD. This section bears interior threading at its two ends 2 and 3.

Two independent shafts 4 and 5 are journalled inside the crank-gear case 1 namely shaft 4 for the left crank CG and shaft 5 for the right crank CD.

Shaft 4 is a tubular element widening from left to right in several steps, in the interior as well as on the exterior.

The left portion 4a bears interior threading for fastening crank CG by means of a bolt (not shown), this fastening being of a standard type. On the exterior, part 4a is surrounded by a ball-bearing 6 fitted into the end of a stiffening sleeve 7 coaxially surrounding shaft 4. This same end of sleeve 7 is received in a nut 8 closing on this side the crank-gear case 1 and screwed into the threading 2. Sealing is assured on shaft 4 by means of a packing 9.

The central portion 4b of shaft 4 extends over the quasi totality of the crank-gear case 1. It is surrounded at the right by a needle bearing 10.

The righthand part 4c of shaft 4 extends outwardly from case 1 and is united with a guide 11 which extends radially relative to the axis X—X. At the interior of this righthand part 4c is arranged a needle bearing 12 which is fitted on a shoulder 5d of shaft 5.

The latter takes the form of a massive stepped arbor including four shoulders 5a to 5d of increasing diameter from left to right. This arbor ends at the right with a threaded portion 5e for fastening likewise in a well-known manner crank CD.

Portions 5a and 5b each receive bearings, namely two ball-bearings 13 and a needle bearing 14 mounted in the bore of the intermediate portion 4b of shaft 4. A screw 15 maintains the bearings 13 on their portion 5a.

It appears thus that shafts 4 and 5 journal together in the same sense around axis X—X while being free to oscillate relative to one another about the same axis on bearings 10 and 13.

Shaft 5 is likewise fixed to a guide 16 extending radially in the same plane as guide 11 but in a sense practically opposite relative to the latter. To this effect guide 11 includes at its right end a peripheral notch 17 which extends over slightly more than 180° in order to provide space for the guide 16 borne by this shaft 5.

A nut 18 is screwed into the threaded end 3 of the crank-gear case 1 until it abuts against the sleeve 7, itself axially supported against the bearing 6 and the nut 8.

Nut 18 extends out of the case 1 over a certain distance and surrounds portion 4c of shaft 4. In this zone nut 18 exhibiting a polygonal outer profile 19 herein octagonal, on which is received a decentering ring 20 forming an excentric, itself on the interior provided with an octagonal opening 21. This ring is axially maintained against the edge of the end of the crank-gear case 1 by a threaded tightening ring 22 screwed on the corresponding threaded end of nut 18.

The outer peripheral surface 23 of ring 20 is cylindrical and decentered relative to axis X—X, but centered on axis Y—Y which is offset by a distance d relative to axis X—X. Axis Y—Y is situated in the same horizontal plane as axis X—X, in the forward direction relative to the normal sense of advance of the bicycle.

A ball-bearing 24 is fitted onto the outer surface 23 of ring 20. This bearing is furthermore mounted in an opening 25 of an interior flange 26 of a protection housing 27, this latter being thus rotatively mounted around axis Y—Y. This housing is closed by an outer flange 28 applied to flange 26 by screws 29 (see in particular FIG. 2). Sprocket plates B are fixed to the housing 27.

In the inner flange 26 are found two diametrically opposed bores or sockets 30, their axes Z—Z being parallel to axes X—X and Y—Y. The two axes Z—Z are situated at an equal distance from axis Y—Y. In these sockets are engaged journals 31 on which are mounted for free rotation the respective rollers 32, themselves retained in guides 11 and 16 respectively. Journals 31 are likewise maintained in sockets 33 provided in the outer flange 28 facing sockets 30 of the inner flange 26. It will be noted that rollers 32 are mounted on the journals 31 themselves supported at their two ends in flanges 26 and 28 respectively. There results therefrom a very rugged rotational suspension of these rollers in their guides 11 and 16 without overhangs.

Each guide 11 or 16 (FIG. 5) is shown in the example under consideration in the form of a fork-like plate including a notch 34 with a rounded bottom and the lateral walls of which form the rolling pads for the respective rollers 32. In other words, these rolling pads confine the rollers in the spaces within which they are obliged to be displaced during the course of rotation of the cranks from one position to another in a path defined by the circumference centered on axis X—X. This movement will be further explained in respect of FIGS. 7A and 7B. For the transmission of the driving effort, only one of these lateral walls of each notch is active and, accordingly, it may be lined with a hard packing material 36.

The inner flange 26 includes several radial feet on which are supported the sprocket plates B to mesh with the bicycle chain F.

Housing 27 is closed in front by a central plate 38 fixed to shaft 4 and which assures sealing of the housing by means of a sealing ring 39 interposed between the periphery of this plate and the edge of the central opening of flange 28. Thus the housing 27 constitutes an entirely closed off space which in particular protects the guides 11 and 16 as well as rollers 32 against incoming dirt and gravel.

Figure 7A:
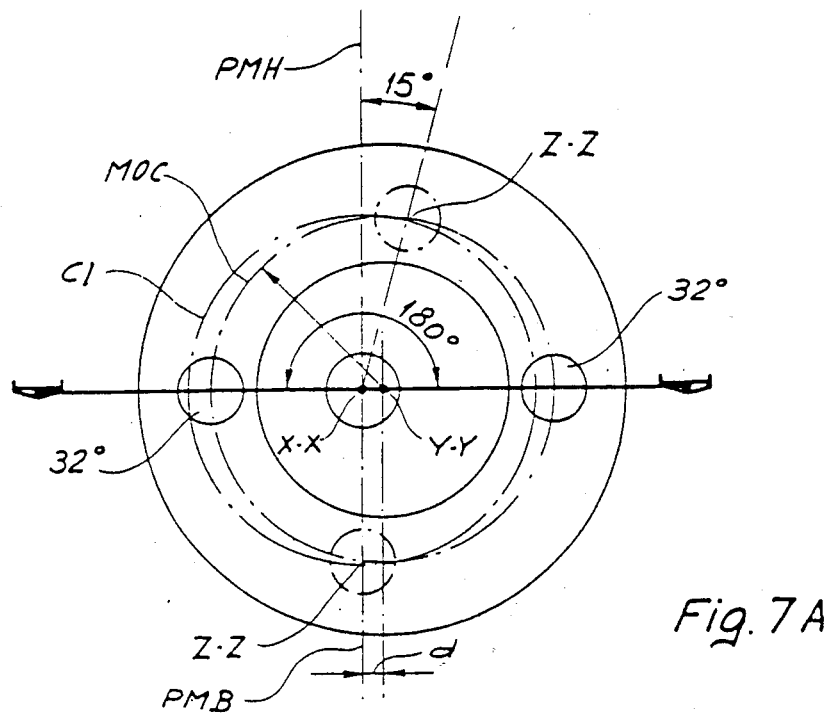
FIGS. 7A and 7B are two schematic views illustrating the operation of the crank-gear according to FIGS. 4 to 6.
Figure 7B:
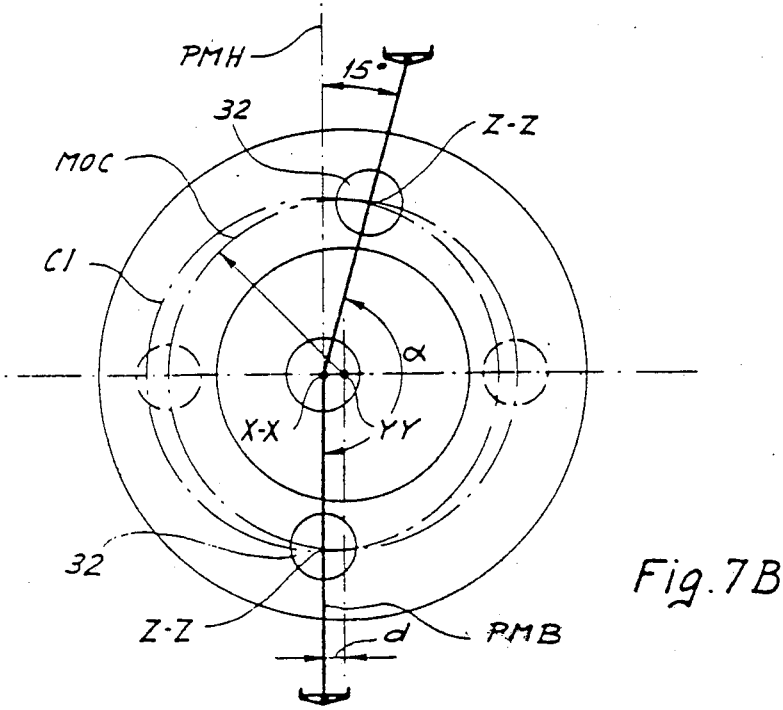

There will now be described the operation of the crank-gear according to the invention in referring to FIGS. 7A and 7B, which represent respectively two positions of the crank-gear offset relative to one another by 90°. These positions are repeated at each half rotation of the crank-gear with the evident difference that the positions of the left and right cranks are inverted each time.

If one examines the movement of rollers 32 maintained in housing 27 relative to axis Y—Y, it is noted that they describe an orbital circular movement MOC, since the journals 31 have a fixed radial position relative to this axis. However, taking into account the offset d between axes X—X and Y—Y, these rollers are displaced relative to axis X—X according to an oscillating motion causing their axis Z—Z to pass alternatively to the interior and the exterior of a circumference CI the center of which is situated on axis X—X and the radius of which is equal to the distance between axes Z—Z and the axis Y—Y thus equal to that of the circle MOC. Suppose that the rotational speed of the sprocket plate B is constant and that the movement commences from the horizontal aligned position (FIG. 7A), one of the cranks must accelerate in order to catch up with the effect of offsetting of the axes XX and Y—Y while the other must simultaneously decelerate. From this there results finally that the first has a constantly increasing speed while the other has a constantly decreasing speed until they are once again horizontally aligned. In the next part of the rotation, the evolution of the speed evidently applies in the same manner but inversely at the cranks. It has been confirmed that this variation in speed, in all very small, is not a problem for the cyclist. What on the other hand is very advantageous is that the crank which has just risen has already crossed over the top dead center point (symbolized by the broken line PMH on FIGS. 7A and 7B), while the other is at the bottom dead center point PMB. As already mentioned, the offset at this position of the upper crank may be on the order of 15° relative to the vertical. On the other hand, when one of the cranks is at the upper dead center, the orther has not yet reached the bottom dead center.

This principle of operation, known from the French utility certificate of 2.526.392, is here put into practice due to this invention in a far more simple manner with an assembly having sufficient ruggedness to be employed usefully in a bicycle and not requiring any more maintenance than in an ordinary bicycle provided with a derailleur and mechanism for switching sprocket plates of known type.

It will be noted in effect that shafts 4 and 5 are supported for rotation in the crank-gear case 1 over a substantial length, this advantageous characteristic being further amplified by the fact that the shaft 4 is tubular in order to receive shaft 5 over almost its entire length.

It is likewise to be noted that guides 11 and 16 extend in the same radial plane and are found in the immediate neighbourhood of the open end of the crank-gear case 1. There is thus practically no overhang of shafts 4 and 5 at the place where they are coupled to guides 11 and 16 required in turn to transmit the pedalling effort to the sprocket plates and from there, to the bicycle chain.

Furthermore, from the fact that shafts 4 and 5, the guides and the rollers 32 are closed in spaces sealed from the exterior, the mechanism is well protected against dirt.

It will be likewise noted that cranks CG and CD may be of standard type since their fastening to shafts 4 and 5 respectively is in no manner different from that employed usually for bicycles of the type already known in the art.

FIG. 8 shows a cross-section of another embodiment of the crank-gear according to the invention where the two cranks situated respectively at the right (CD) and at the left (CG) are no longer fixed to two coaxial shafts. In this variant, effectively, one of the cranks e.g. the left crank CG, is fixed to a single shaft having axis X—X traversing the crank-gear case and which bears at its opposite end the second crank CD itself susceptible at each rotation of the crank-gear, to pass through a relative clearance of limited amplitude around this shaft enabling to assure in accordance with the invention the offset of the two cranks in the vertical position and at the same time their alignment in the horizontal position in order to respond to the precedingly defined objectives.

In this variant embodiment which outside the characteristic dispositions briefly mentioned hereinabove, takes up in return for the most part an analogous arrangement to that described in the first variant, the necessary explanations will be limited to the essential elements, without going into detail in the description of secondary arrangements which have already been mentioned or are directly evident from the data given for persons skilled in the art.

In this variant, there is thus found the crank-gear case 101 on the interior of which is mounted a single transversal shaft 102. Shaft 102 is hollow and is journalled in the interior of the crank-gear case 101 around the first axis X—X previously defined, turning in two sockets fixed to the case, respectively 103 and 104, through a ball—bearing 105 arranged at the end of the case on the side of the lefthand crank and in needle bearings 106 and 107 on either hand, in the neighbourhood of the cranks.

The lefthand crank (CG) is fixed onto the end of shaft 102 which extends out of the crank-gear case 101 over a sufficient predetermined distance by means of a fastening assembly 108 the details of which are in themselves well known and of little importance to the invention.

As the opposite extremity, arranged towards the right-hand crank (CD), the hollow shaft 102 includes a fastening stud 109 of which a threaded end 110 is screwed into the axis of shaft 102 to butt up against a threaded ferule 111 mounted on the interior of the shaft. On the outer surface 109a of stud 109, beyond the corresponding end of the crank-gear case 101 is mounted the righthand crank (CD), the latter being susceptible to undergo, according to the invention, a relative clearance with regard to the lefthand pedal (CG) during the operation of the crank-gear, in particular during the course of a complete rotation of the latter about axis X—X.

The crank-gear case 101 exhibits at its end directed towards the righthand crank (CD), a fixed decentering ring 112 on the outer surface of which is arranged a ballbearing 113, the axis Y—Y of this decentering ring 112 being, in conformity with the invention, offset by a given distance d relative to axis X—X as previously mentioned. On the outer cage of the bearing 113 is furthermore mounted a protection housing 114 supporting the sprocket plates B of the crank-gear, this housing including in its surface directed towards the righthand crank a depressed seating 115 enabling mounting of the guides which assure the functioning of the offset of the cranks. This seating 115 is closed towards the exterior by a flange 116 against the outer surface of which bears a sealing packing 117 fixed onto the righthand crank (CD) in order to provide sealing of the seating 115 and protection of the moving parts which it contains with regard to dirt coming from the outside and in certain cases road gravel.

Figure 9:
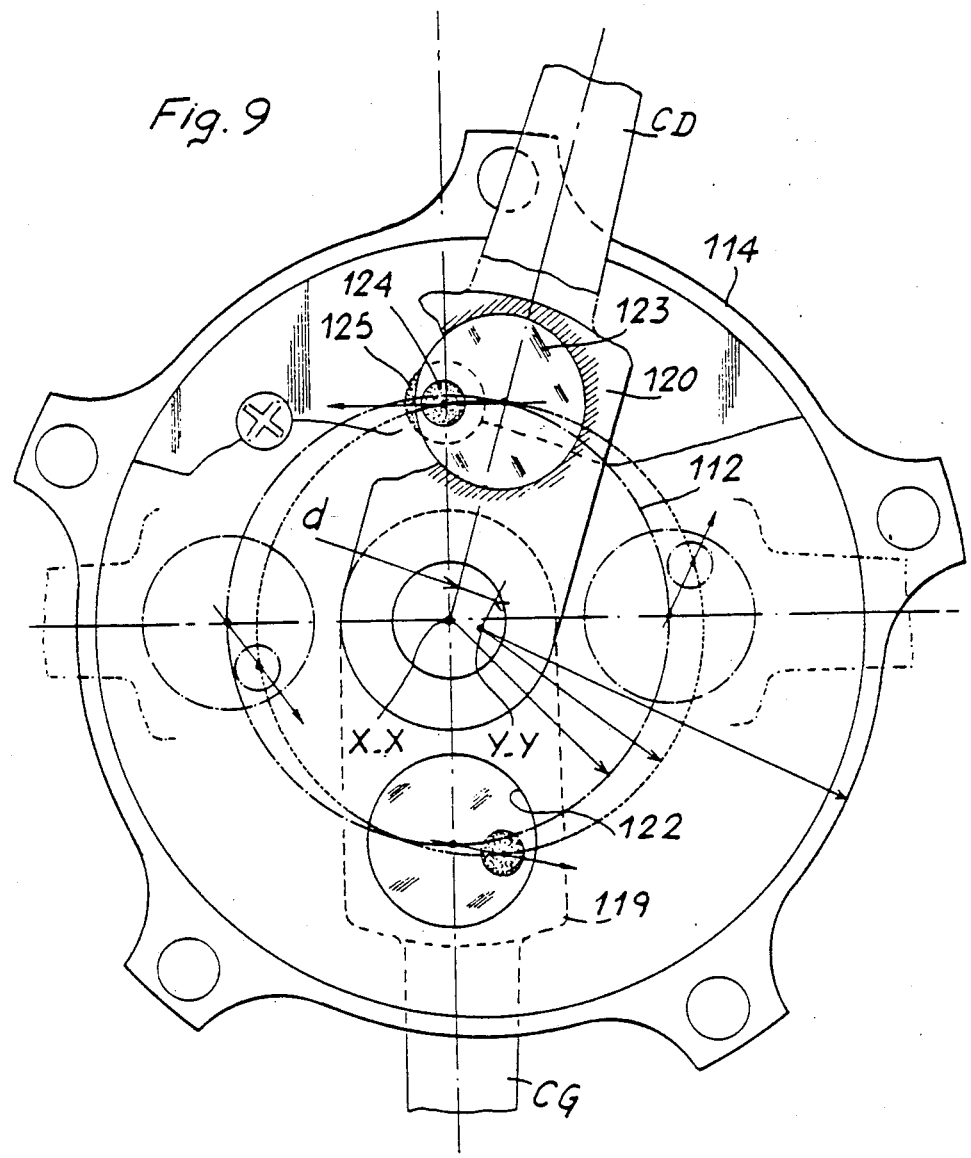
FIG. 9 is a face view of the crank-gear of FIG. 8.

The shaft 102 fixed to the lefthand crank (CG) of the crank-gear, extends at the side of the housing 114 and to the interior of this latter by a splayed out portion 118 itself connected in a plane perpendicular to axis X—X by a first guide 119 more particularly visible on FIG. 9. In the same manner, the righthand crank (CD) is united with a second guide 120 fixed against the internal surface of this crank by screws 121, guides 119 and 120 being arranged essentially in extension of one from the other in a plane perpendicular to the axis X—X of shaft 102.

According to the invention and in conformity with a special characteristic of the embodiment under consideration, each of guides 119 and 120 includes substantially at its center a circular seating 122 best visible on FIG. 9 on the interior of which is emprisoned a flat cylindrical roller 123. These rollers are furthermore connected to the housing 114 via a journal 124 traversing the roller and including a head 125 engaged in a facing socket 126 in the housing 114, these studs assuring for each of the rollers borne by the two guides 119 and 120 an oscillating coupling between the housing turning on the decentering ring 112 around axis Y—Y and the cranks CG and CD, themselves turning around the axis X—X with the possibility between them of an appropriate relative offset.

The operation of the crank-gear in the variant shown on FIGS. 8 and 9 is analogous to that of the first embodiment. Effectively, due to the mounting of the decentering ring 112 with axis Y—Y on the crank-gear case 101 having axis X—X on the one hand and to the possibility for the cranks CG and CD to undego a relative clearance with respect to one another around this same axis X—X, there is obtained an oscillating orbital motion of each of the cranks consequent to the cooperation in their respective seatings 122 of rollers 123 carried by the two guides 119 and 120 coupled to these cranks. The variation in speed of displacement of the cranks which results therefrom during the course of a complete cycle of rotation of the crank-gear, is obtained in an exactly equivalent fashion, these cranks being situated in the same plane when they are in a horizontal position and in return offset by an angle determined by design considerations when the lefthand crank is in its vertical position the righthand crank being then slightly in advance.

The variant of the embodiment considered hereinabove has the advantage relative to the preceding to enable a simplified assembly of the cranks relative to one another by permitting the fastening of the second directly onto the axis of the first and avoiding thereby the necessity of providing through the decentering ring a polygonal opening for blocking the assembly constituted by the two coaxial shafts provided in the first variant. Furthermore, mounting of the rollers 123 in the closed circular seatings 122 provided in each of the two guides connected to the two respective cranks permits the assurance of a constant and permanent guidance of these rollers in the course of the successive rotations of the crank-gear which may thus more easily be entirely sealed and hence better protected relative to dirt and gravel coming from the exterior.

What is claimed is:

1. A crank-gear for a bicycle comprising two cranks for bearing pedals and which are rotatively mounted about a first axis in a crank-gear case fixed to the bicycle frame, at least one sprocket plate having teeth to actuate a chain and rotatively mounted in said gear case about a second axis parallel to the first axis, but offset relative to the latter by means of a decentering ring fixed on the crank-gear case and exhibiting an external cylindrical surface centered on the second axis, and transmission means comprising two guides, each of which is rigidly fixed to a corresponding one of said cranks and radially disposed relative to the first axis, and a roller for each crank arranged to be displaced relative to the corresponding guide while being supported thereon in a circumferential direction so as to transmit a pedalling force, said rollers corresponding to the cranks being fixed to said sprocket plate so as to describe in the course of crank rotation an oscillating orbital movement, said cranks being mounted to rotate in said crank-gear case relative to one another about said first axis and said guides being arranged in a common plane parallel to the plane of the sprocket plate.

2. A crank-gear as set forth in claim 1 wherein the cranks are respectively fixed to two coaxial shafts mounted so as to rotate relative to one another, the guides being fastened to one of the common extremities of said shafts.

3. A crank-gear as set forth in claim 1 wherein one of the cranks is fixed to a shaft journalled through the crank-gear case and capped at its end proximate the sprocket plate by the corresponding guide, the other crank being mounted coaxial to said shaft and fixed to its respective guide extending parallel to said other crank.

4. A crank-gear as set forth in claim 2 wherein one of said shafts is tubular, the other shaft being placed in said tubular shaft and extending practically over the entire length thereof.

5. A crank-gear as set forth in claim 1 including a housing mounted to rotate in the crank-gear case around the decentering ring, and fixed to said sprocket plate and enclosing said transmission means.

6. A crank-gear as set forth in claim 3 wherein said rollers are retained in circular housings provided in each guide wherein they undergo an oscillating motion.

7. A crank-gear as set forth in claim 5 wherein each roller is carried by a journal mounted in a hole or socket provided in the housing.

8. A crank-gear as set forth in claim 5 wherein the housing is mounted on the decentering ring by means of a bearing.

9. A crank-gear as set forth in claim 2 wherein the decentering ring includes a polygonal opening centered on the first axis and fixed on a nut having a corresponding outer profile and screwed into the crank-gear case.

10. A crank-gear as set forth in claim 7 wherein the housing is closed by at least one flange, the journals maintaining the rollers against the interior wall of said flange.

11. A crank-gear as set forth in claim 1 wherein said rollers and said guides are arranged in said common plane parallel to the plane of the sprocket plate.

12. A crank-gear for a bicycle comprising two cranks for bearing pedals and which are rotatively mounted about a first axis in a crank-gear case fixed to the bicycle frame, at least one sprocket plate having teeth to actuate a chain and rotatively mounted in said gear case about a second axis parallel to the first axis, but offset relative to the latter by means of a decentering ring fixed on the crank-gear case and exhibiting an external cylinder surface centered on the second axis, and transmission means comprising two guides, each of which is rigidly fixed to a corresponding one of said cranks and radially disposed relative to the first axis, and a roller for each crank arranged to be displaced relative to the corresponding guide while being supported thereon in a circumferential direction so as to transmit a pedalling force, said rollers corresponding to the cranks being respectively engaged in said guides and fixed to said sprocket plate so as to described in the course of crank rotation an oscillating orbital movement, said cranks being mounted to rotate in said crank-gear case relative to one another about said first axis and respectively fixed to two coaxial shafts mounted so as to rotate relative to one another, said guides being respectively fixed to one of the common extremities of said shafts and arranged in a common plane parallel to the plane of the sprocket plate, and said guides being formed by plates in the form of a fork respectively fixed to said shafts and radially extending in said common plane in diametrically opposed senses.

* * * * *